(12) United States Patent
Alexiew

(10) Patent No.: US 6,481,934 B1
(45) Date of Patent: Nov. 19, 2002

(54) COMPOSITE FABRIC WEBS FOR REINFORCING SOIL LAYERS

(75) Inventor: Dimiter Alexiew, Gescher (DE)

(73) Assignee: Huesker Synthetic GmbH & Co., Gescher (DE)

(*) Notice: Subject to any disclaimer, the term of this patent is extended or adjusted under 35 U.S.C. 154(b) by 0 days.

(21) Appl. No.: 09/700,081

(22) PCT Filed: May 3, 1999

(86) PCT No.: PCT/EP99/02976

§ 371 (c)(1),
(2), (4) Date: Nov. 9, 2000

(87) PCT Pub. No.: WO99/58767

PCT Pub. Date: Nov. 18, 1999

(30) Foreign Application Priority Data

May 11, 1998 (DE) .......................... 198 20 951

(51) Int. Cl.$^7$ ................................. E02B 3/12
(52) U.S. Cl. ................... 405/302.7; 405/302.6; 405/258.1; 442/58
(58) Field of Search .......... 405/302.7, 302.6, 405/302.4, 258.1, 15–17; 442/58, 50, 402, 149

(56) References Cited

U.S. PATENT DOCUMENTS

| | | | |
|---|---|---|---|
| 3,575,777 A | * 4/1971 | Allport ................. | 442/50 |
| 4,298,645 A | * 11/1981 | Obayashi et al. ....... | 442/220 |
| 4,472,086 A | 9/1984 | Leach | |
| 4,619,120 A | * 10/1986 | Markowitz ............ | 66/192 |
| 4,837,387 A | 6/1989 | Van De Pol | |
| 4,960,349 A | 10/1990 | Willibey et al. | |
| 5,091,247 A | 2/1992 | Willibey et al. | |
| 6,139,955 A | * 10/2000 | Girgis ................. | 405/15 |
| 6,171,022 B1 | * 1/2001 | Decker ................ | 405/15 |
| 6,171,984 B1 | * 1/2001 | Paulson et al. ........ | 405/15 |

FOREIGN PATENT DOCUMENTS

| | | |
|---|---|---|
| DE | 3430842 | 3/1985 |
| DE | 4138506 | 9/1992 |
| DE | 9400650 | 4/1994 |
| DE | 4316015 | 11/1994 |
| DE | 29509066 | 10/1995 |
| EP | 0024777 | 3/1981 |
| WO | 95/11350 | 4/1995 |

OTHER PUBLICATIONS

English Language Abstract of DE 3430842.
English Language Abstract of DE 4138506.
English Language Abstract of DE 9400650.
English Language Abstract of WO94/26503.
English Language Abstract of DE 29509066.
Mosch, Kurt; "Geotextilien Stabilisieren", *TIS*, Nov. 1990, pp. 793,794,796,797.
Schnabel, Werner; "Geotextilien für Strassenböschungen", *TIS*, Jul. 1976, pp. 524–526.
*DIN* 61 210, Entwurf, Jul. 1976, S. 1–3.

\* cited by examiner

*Primary Examiner*—Frederick L. Lagman
(74) *Attorney, Agent, or Firm*—Greenblum & Bernstein, P.L.C.

(57) ABSTRACT

Composite fabric for reinforcing soil layers, including a textile lattice and a water-permeable, flat textile structure which is joined to the lattice. The invention provides a geotextile composite fabric web whose positioning not only achieves good reinforcement but also allows for the rapid and reliable consolidation of the subsoil situated beneath the textile composite fabric web. The lattice includes strips which are at least 4 cm wide, extend at distances of at least 30 cm in the longitudinal direction of the composite fabric web and have high tensile strength, and second strips which are at least 4 cm wide, extend at distances of at least 30 cm at right angles to the first strips and have high tensile strength. At the points of intersection, the second strips are joined to the first strips in a non-slip manner.

25 Claims, 3 Drawing Sheets

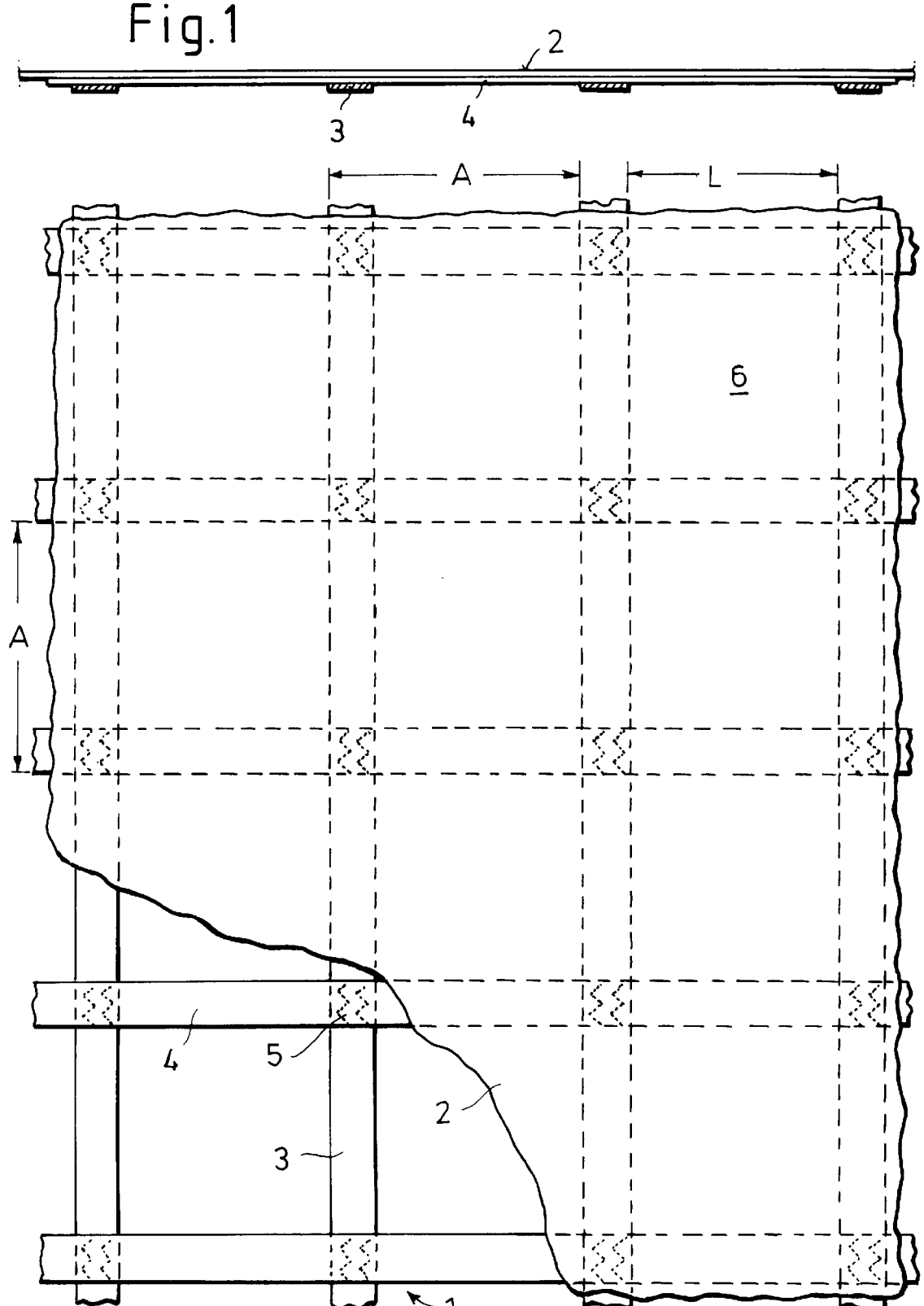

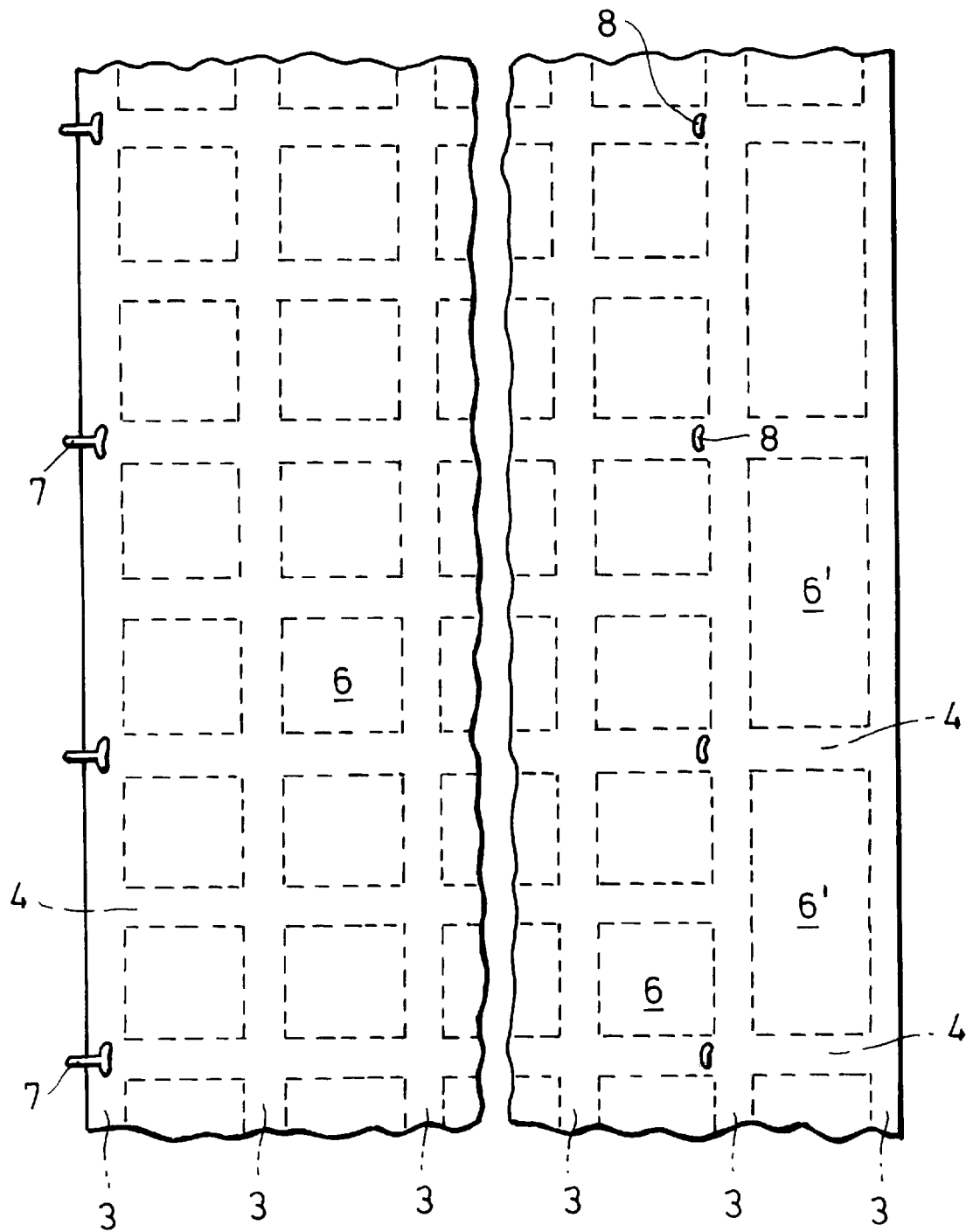

COMPOSITE FABRIC WEBS FOR REINFORCING SOIL LAYERS

CROSS-REFERENCE TO RELATED APPLICATIONS

The present application is a U.S. National Stage application of International Application No. PCT/EP99/02976, filed May 3, 1999, which claims priority under 35 U.S.C. §119 of German Application No. 198 20 951.7 filed May 11, 1998.

BACKGROUND OF THE INVENTION

1. Field of the Invention

The invention relates to a composite fabric web for reinforcing soil comprising of a textile lattice and a water-permeable flat textile structure joined to the lattice.

2. Discussion of Background Information

Geotextile composite fabric webs of this kind are known from the U.S. Pat. No. 4,472,086. The lattice as well as the flat textile structure, formed by a mat, of the known composite fibrous web have a stretchability of less than 5%. Further, the mesh width of the lattice is relatively small. These geotextile composite fabric webs are designated and used for the reinforcement of layers of black top. Further, for reinforcing soil layers, lattice structures of highly modular polyester threads are known whose mesh width lies between 20 mm and 50 mm which are particularly suitable for securing topographical steps, for reinforcing the upper layer of traffic surfaces, earth dams, noise protection barriers, and the like.

SUMMARY OF THE INVENTION

The present invention is based on as aspect of creating a geotextile composite fabric web of the type mentioned at the outset that not only achieves a good reinforcement by its incorporation but also allows the subsoil situated underneath the textile composite fabric web to be consolidated quickly and reliably According to an aspect of the invention a composite fabric web for reinforcing soil layers is provided. The web comprises a textile lattice and a water-permeable flat textile structure connected to the lattice. The lattice comprises of highly tension resistant strips having a width of at least 4 cm positioned in the longitudinal direction of the composite fabric web at a distance from one another of at least 30 cm and of highly tension 'resistant second strips having a width of at least 4 cm, positioned laterally to the first strips at a distance from one another of at least 30 cm and being connected to the first strips at the crossing points in a slip-resistant fashion, and in that the flat textile structure comprises of a tear-resistant material stretchable by at least 25%, preferably 35% to 80%, e.g., nonwoven, knitted materials or the like, and is positioned above the lattice.

After spreading the composite fibrous web according to the invention onto the level of the subsoil to be consolidated, a layer, 30 to 60 cm thick, of sand, gravel, rubble, and, optionally, also broken rocks, is dumped and this layer is compacted, for instance, via rolls and tampers. Here, the accumulated layer presses the highly stretchable flat textile structure, in particular a non-woven, into the stretchable, aqueous base, with pore water being pressed upward through the filtering flat textile structure. In compacting the filling, the stretchable flat textile structure bulges downward between the longitudinally and laterally positioned strips of the lattice by which a strong interlocking is achieved between the filling and the base. At the same time, the contact surface increases between the base and the filtering flat textile structure so that the extraction of water from the aqueous base is accelerated as well. After adding a second and, optionally, a third filling, further compacting can occur with increased pressure without the risk of the downward bulging textile flat structure tearing, because bridges or arches form above the empty areas of the lattice inside the filling resting on the strips of the lattice. When the filling is thicker than the clear width of the areas of the lattice, the compacting forces essentially effect only the strips of the lattice so that a further increase of stress in the stretchable flat textile structure is no longer to be expected. The stretchable, water-permeable, and filtering flat textile structure can be a knitted or a woven web, preferably a formed fabric, however, that is needled for reinforcement. This non-woven can be 2 to 6 mm thick and has a protecting function for the load-bearing strips of the lattice during the compacting of the filling.

With the aid of the fibrous composite web, the consolidation of the base of roadways and traffic areas can be considerably improved and accelerated. At the same time, a reliable interlocking is achieved between the base and the filling, although a filtering layer is positioned between the base and the filling which prevents the clay-type parts of the base from reaching the granular and hydrophobic filling. Finally, a strong reinforcement is achieved in the layer in which the base is connected with the filling.

According to an aspect of the present invention, a composite fabric web for reinforcing soil layers is provided, comprising a textile lattice; and a water-permeable flat textile structure connected to and positioned above said lattice. The textile lattice includes a plurality of highly tension resistant first strips, having a width of at least 4 cm, positioned in a substantially longitudinal direction of said composite fabric web at a predetermined distance from one another of at least 30 cm, and a plurality of highly tension resistant second strips, having a width of at least 4 cm, positioned substantially laterally to said first strips at a distance from one another of at least 30 cm and being connected to said first strips at crossing points in a slip-resistant manner.

According to another aspect of the invention, the flat textile structure includes a tear-resistant material which is stretchable by at least 25% of an unstretched length of the tear-resistant material. According to a further aspect of the present invention, the flat structure includes a tear-resistant material which is stretchable by at least 35% of the unstretched length of the tear-resistant material. In another aspect of the invention, the tear-resistant material is stretchable up to about 80% of the unstretched length of the tear-resistant material.

Other aspects of the invention include, a tear-resistant material comprises a nonwoven, knitted material. According to a further aspect of the present invention, a clear width between the strips is 30 cm to 60 cm. Additionally, other aspects include the width of the strips being between 6 and 12 cm. Other aspects include strips which include of one of highly modular threads or fibers having a tensile resistance of more than 15 kN. In another aspect of the present invention, the strips have a tensile resistance of more than 30 kN.

According to a further aspect of the present invention, the textile lattice has a tensile resistance of between 50 and 150 k N/m in the longitudinal direction and in the lateral direction. In another aspect of the present invention, the strips of the lattice comprise woven of highly modular warp threads and connecting weft threads. According to a further aspect of the present invention, the strips include thread layers with highly modular warp threads running in the longitudinal direction that are sewed together.

In another aspect of the present invention, clear areas are formed by the lattice are rectangular-shaped. According to a still further aspect of the present invention, the clear areas are square-shaped. According to a different aspect, wherein, at least at one edge of the composite fabric web, rectangular areas are provided whose length is at least twice as long as the length of the other clear areas. According to another aspect of the present invention, wherein the stretchable flat textile structure is a needled nonwoven fabric of syhthetic fibers with a thickness of 1.5 to 6 mm and a tear resistance of at least 1.5 kN piston force. Further aspects of the invention include, wherein the stretchable flat textile structure is a needled nonwoven fabric of synthetic fibers with a thickness of 1.5 to 6 mm and a tear resistance of at least 1.5 kN piston force according to DIN 54307 and DIN EN 776.

Other aspects include, wherein, on edge areas of the composite fabric web, coupling devices are provided at the laterally running second strips that cooperate with complementary coupling devices of a neighboring composite fabric web.

According to other aspects of the present invention, wherein the coupling devices include one of hooks and eyelets and the complementary coupling devices include the other of eyelets and hooks, respectively. According to another aspect of the invention, the web is about 8 to 12 m wide and is folded in the area of its longitudinal center into a 4 to 6 m wide double web and then coiled into a roll. According to a further aspect of the invention, the composite fabric web is folded in such a way that the stretchable flat textile structure lies inside and the longitudinally running strips of one half are positioned between the strips of the other half.

According to a still further aspect of the invention, a process is provided for consolidating a soil layer. A composite fabric web including, a textile lattice having, a plurality of highly tension resistant first strips, having a width of at least 4 cm, positioned in a substantially longitudinal direction of the composite fabric web at a predetermined distance from one another of at least 30 cm, and a plurality highly tension resistant second strips, having a width of at least 4 cm, positioned substantially laterally to the first strips at a distance from one another of at least 30 cm and being connected to the first strips at crossing points in a slip-resistant fashion, and a water-permeable flat textile structure connected to and positioned above said lattice, is provided. The process includes spreading the composite fabric web onto the soil of a soil layer to be consolidated; compressing the composite fabric web with a filling of a mixture of at least one of sand, gravel, rubble, and broken rock in a layer of 30 to 60 cm, but not higher than a clear width of the lattice areas; compressing the filling first statically and then dynamically with a contact pressure of 50 to 150 kN/m²; applying a second layer of filling of at least 30 cm; and further compressing the second layer.

According to another aspect of the invention, the second layer is compressed with an increased force. In yet another aspect of the invention, the process is used for consolidating a soil layer for a roadway. According to another aspect of the present invention, the process includes installing a second composite fabric web next to a first installed composite fabric web, which overlaps the first composite fabric web to such an extent that the areas at the left or right edge of the second composite fabric web are positioned above the areas at the right or left edge of the first composite fabric web.

Other exemplary embodiments and advantages of the present invention may be ascertained by reviewing the present disclosure and the accompanying drawing.

BRIEF DESCRIPTION OF DRAWINGS

FIG. 1 a front view and

FIG. 2 a top view of a fibrous composite web according to the invention,

DETAILED DESCRIPTION OF THE INVENTION

Figure 3:
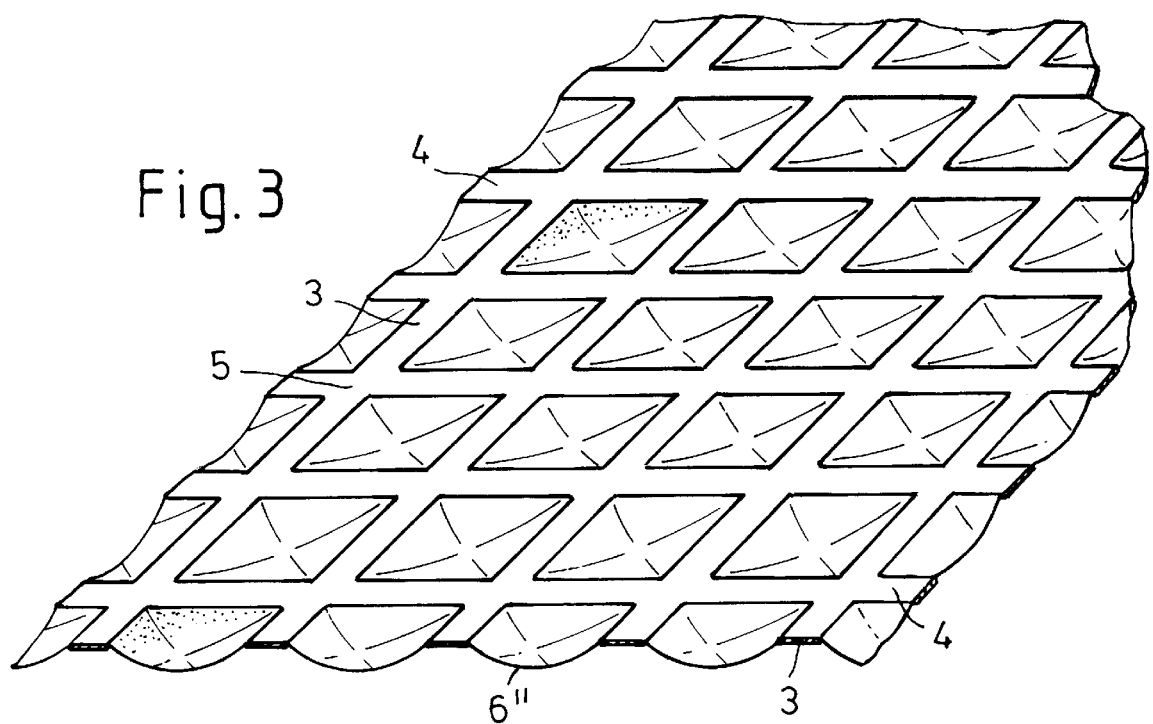
FIG. 3 a view of the fibrous composite web in perspective according to FIG. 2 in the incorporated state, FIGS. 4 through 6 three stages of the fibrous composite web according to the invention during the construction of an embankment for roadways, FIG. 7 a top view of another exemplary embodiment of the fibrous composite web.

FIGS. 1 through 3 depict a fibrous composite web for reinforcing and consolidating of soil and ground layers which is composed of a supporting lattice 1 and a flat textile structure 2, covering the lattice 1, which is made from a very stretchable material, in particular a non-woven, being capable of absorbing comparatively strong forces in a stretched state. The lattice 1 comprises of stretch-stiff, extension-resistant strips 3 at least 4 cm, preferably 6 to 10 cm, wide and at a distance from one another of at least 30 cm, preferably 40 to 64 cm, in the longitudinal direction of the fibrous composite web and strips 4 running laterally to the strips 3, which are also stretch-stiff and highly extension-resistant and are at least 4 cm, preferably 6 to 10 cm, wide and have a distance from one another of at least 30 cm, preferably 40 to 65 cm.

The crossing strips 3 and 4 are connected to one another in a slip-resistant fashion at the crossing points 5. The connection of the strips 3 and 4 can occur at the crossing points 5 by means of sewing, weaving, needling, clamping, adhering, or welding.

The flat textile structure 2 positioned above the lattice 1 is connected to the lattice 1 in points or over the entire surface. This connection can occur by sewing, needling, clamping, adhering, or welding, as well.

Between the lengthwise positioned and laterally positioned strips 3, 4, areas 6, preferably square, are positioned whose clear width is between 30 and 60 cm. The flat textile structure 2 being positioned in these areas 6 bulges downward 6", as depicted in FIG. 3, when a layer of sand, gravel, rocks, and mixtures thereof is applied to the composite structure and, when this layer, 30 to 60 cm thick, is compacted together with the base positioned underneath it. By this bulging of the stretchable flat textile structure 2 between the strips 3 and 4 of the lattice 1, a very good interlocking is achieved between the filling and the base. This prevents the filling above the geotextile structure from sliding off.

The flat textile structure 2, which is stretchable by 30 to 100%, can be a non-woven, a knitted web, or a woven web. This flat textile structure 2 positioned above the strips 3, 4 of the lattice 1 has a protective function for the supporting strips 3, 4 of the lattice 1 during the compacting of the filling. A mat of needled polypropylene fibers or polyethylene fibers, 3 to 5 mm thick and acting as a filter layer, is particularly suitable for the flat textile structure 2.

The strips 3 and 4 of the lattice 1 can be made of highly resistant polyester filament thread, of highly resistant polyamide 6, 6, or of similar threads of synthetic fibers. The strips 3, 4 can be woven, with only the load-bearing warp threads comprising of highly resistant material while the weft threads have only the function of holding the warp threads together.

Figure 4:
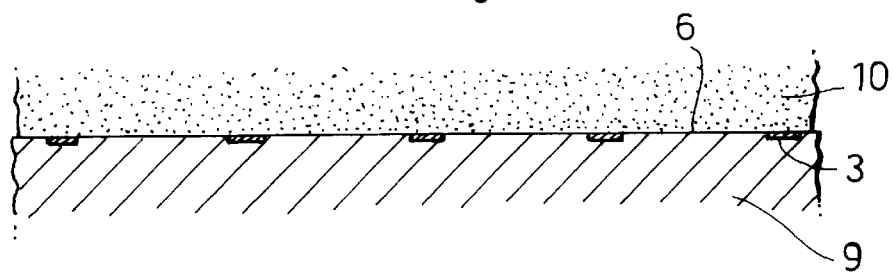

FIG. 4 depicts a fibrous composite web unrolled onto the base 9 onto which a loose layer 10 of non-binding soil is accumulated, in particular sand, gravel, rubble, and the like. The thickness of this layer 10 is roughly equivalent to the clear width L of the areas 6. The base 9 is soft, excessively moist, with low bearing capacity, compressible, plastic, and predominantly cohesive, and has a low water permeability.

Figure 5:
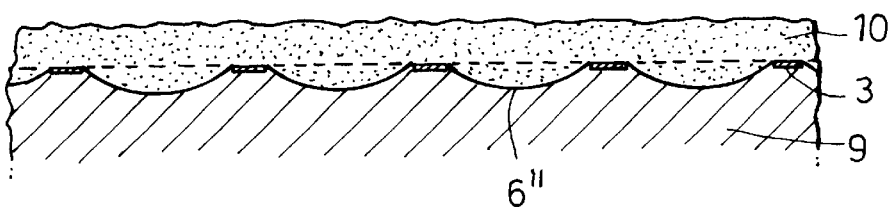

FIG. 5 depicts the situation after the first accumulated layer 10 has been first statically and then dynamically compressed. The compression occurs, e.g., by means of rolls and by means of tampers. By locally impressing into the stretchable areas 6" the base 9, which has not yet been compacted, is vastly compressed and forced to consolidate. The static and dynamic compression forces being exerted onto the accumulated first layer 10 are transferred completely to the base 9 in the clear areas 6. This results in an accelerated consolidation since the compression forces act completely onto the base and drive the water contained in the base upward and results in an enlarged draining surface in the bulged fibrous web layer 2 which facilitates the removal of water from the clay-containing base.

Figure 6:
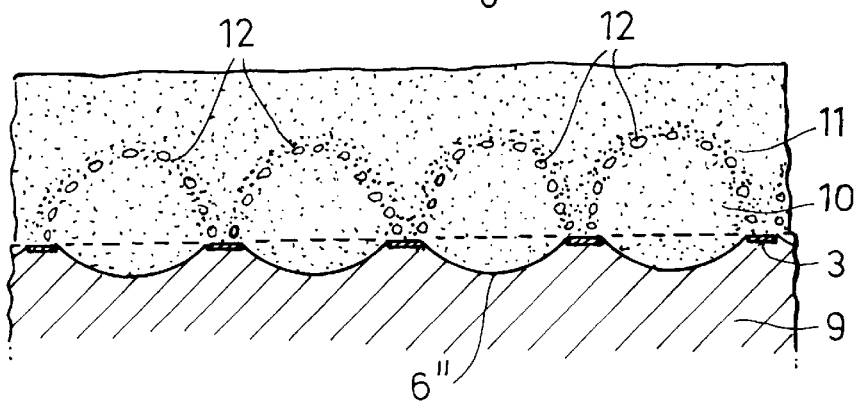

FIG. 6 depicts the situation after the second layer 11 has been accumulated onto the first compressed layer 10 and has then been compressed statically and dynamically. The thickness of the layers 10 and 11 positioned above the composite web is 1 to 1.5 times as large as the clear width L of the areas 6.

The bulging 6" of the areas 6 has been increased by another compression. The water contained in the base 9 has been pressed upward through the flat textile structure 2 or through the non-woven into the granular and water-removing layer 10 and the supporting base 9 is completely compressed as well as the accumulated layers 10 and 11.

Here, the stretchable flat textile structure 2 or the non-woven acts as a separation layer between the base 9 and the filling 10, 11 and as a filter layer the prevents clay material from reaching the accumulated layers 10, 11.

During the compression of layers 10 and 11, comprising of gravel, rubble, and the like, so-called bridges 12 form above the areas 6 whose ends are supported by the strips 3 and 4 so that, during the compression of the second accumulated layer 12, the compression forces act particularly on the strips 3 and 4 of the lattice 1.

During compression, a balance develops between the bulging of the areas 6", the counter pressure of the compressed base 9, and the bridges and arches forming in the granular structure of the accumulated layers 10 and 11, which are supported during further compressions essentially by the strips 3, 4. When the filling is higher than the clear width L of the areas 6, the bridges 12 and the arches will form completely with a sufficient size of the grain of the accumulated material so that further compression can occur with almost unlimited forces without having to fear that the flat textile structure 2 will tear.

The smaller the clear width L of the areas 6 and the larger the rocks contained in the filling, the faster the bridges 12 form during compression which protect the stretched flat structure 2 or the mat against increasing pressure.

FIG. 7 depicts a fibrous composite web according to the invention in which the areas 6' at the right edge are rectangular and have a length twice as long as the other areas 6. If two fibrous composite webs are spread next to each other, the second web is spread overlapping the first in such a way that the areas 6 at the left edge of the second web are positioned above the areas 6' at the right edge of the first web. When compressing the first filling 10, the areas 6 of the second web are pressed into the areas 6' of the first web so that the second web interlocks with the first web and thus creates a reliable connection of the webs positioned next to one another.

The oblong areas 6' can be provided at only one edge of the composite web or on both edges of the composite web. If both edges of the composite web are provided with areas 6' that are twice as long as the square areas 6, it is useful to offset the second and each subsequent web that is positioned next to the spread web by the distance A of the laterally positioned strips 4.

With the aid of coupling elements, e.g., hooks 7 and eyelets 8, that are positioned at the edge areas of the composite web, the optimal overlapping of the composite webs positioned next to one another can be achieved quickly.

The composite web according to the invention is preferably 8 to 12 m wide and folded lengthwise in the middle and coiled to a roll 4 to 6 m wide. In order to coil the composite web into a compact roll and to enable an easy laying thereof by unrolling, the folding of the composite web occurs in such a way that the non-woven layer is positioned on the inside and the lengthwise positioned strips 3 of the one half of the web are positioned between the lengthwise positioned strips 3 of the other half of the web. When laying the composite web, it can easily be unrolled off the coil and then be unfolded into its entire width, whereupon then the web half initially positioned on top is laid onto the soil of the base with its lattice previously being positioned on top.

| List of Reference Characters | |
| --- | --- |
| 1 | Lattice |
| 2 | Flat textile structure |
| 3 | Strip in longitudinal direction |
| 4 | Strip in lateral direction |
| 5 | Crossing points |
| 6 | Clear areas |
| 6' | Rectangular areas |
| 6" | Bulged areas |
| 7 | Hooks |
| 8 | Eyelets, Loops |
| 9 | Base |
| 10 | First filled layer |
| 11 | Second filled layer |
| 12 | Bridge or arch |
| A | Distance |
| L | Clear width |

What is claimed is:

1. A composite fabric web for reinforcing soil layers, comprising:
    a textile lattice; and
    a water-permeable flat textile structure connected to and positioned above said lattice;
    said textile lattice comprising:
        a plurality of highly tension resistant first strips, having a width of at least 4 cm, positioned in a substantially longitudinal direction of said composite fabric web at a predetermined distance from one another of at least 30 cm, and
        a plurality of highly tension resistant second strips, having a width of at least 4 cm, positioned substantially laterally to said first strips at a distance from one another of at least 30 cm and being connected to said first strips at crossing points in a slip-resistant manner.

2. The composite fabric web according to claim 1, wherein said flat textile structure comprises a tear-resistant material which is stretchable by at least 25% of an unstretched length of said tear-resistant material.

3. The composite fabric web according to claim 2, wherein said flat structure comprises a tear-resistant material which is stretchable by at least 35% of said unstretched length of said tear-resistant material.

4. The composite fabric web according to claim 1, wherein said tear-resistant material comprises a nonwoven, knitted material.

5. The composite fabric web according to claim 1, wherein a clear width between said strips is 30 cm to 60 cm.

6. The composite fabric web according to claim 1, wherein the width of said strips is between 6 and 12 cm.

7. The composite fabric web according to claim 1, wherein said strips comprise of one of highly modular threads or fibers having a tensile resistance of more than 15 kN.

8. The composite fabric web according to claim 7, wherein said strips have a tensile resistance of more than 30 kN.

9. The composite fabric web according to claim 1, wherein said textile lattice has a tensile resistance of between 50 and 150 k N/m in the longitudinal direction and in the lateral direction.

10. The composite fabric web according to claim 1, wherein said strips of said lattice comprise woven of highly modular warp threads and connecting weft threads.

11. The composite fabric web according to claim 1, wherein said strips comprise thread layers with highly modular warp threads running in the longitudinal direction that are sewed together.

12. The composite fabric web according to claim 1, wherein clear areas formed by said lattice are rectangular-shaped.

13. The composite fabric web according to claim 12, wherein the clear areas are square-shaped.

14. The composite fabric web according to claim 12, wherein, at least at one edge of said composite fabric web, rectangular areas are provided whose length is at least twice as long as the length of the other clear areas.

15. The composite fabric web according to claim 1, wherein said stretchable flat textile structure is a needled nonwoven fabric of synthetic fibers with a thickness of 1.5 to 6 mm and a tear resistance of at least 1.5 kN piston force.

16. The composite fabric web according to claim 15, wherein said stretchable flat textile structure is a needled nonwoven fabric of synthetic fibers with a thickness of 1.5 to 6 mm and a tear resistance of at least 1.5 kN piston force according to DIN 54307 and DIN EN 776.

17. A composite fabric web for reinforcing soil layers, comprising:
a textile lattice; and
a water-permeable flat textile structure connected to and positioned above said lattice;
said textile lattice comprising:
a plurality of highly tension resistant first strips, having a width of at least 4 cm, positioned in a substantially longitudinal direction of said composite fabric web at a predetermined distance from one another of at least 30 cm, and
a plurality of highly tension resistant second strips, having a width of at least 4 cm, positioned substantially laterally to said first strips at a distance from one another of at least 30 cm and being connected to said first strips at crossing points in a slip-resistant manner,
wherein said tear-resistant material is stretchable up to about 80% of said unstretched length of said tear-resistant material.

18. A composite fabric web for reinforcing soil layers, comprising:
a textile lattice; and
a water-permeable flat textile structure connected to and positioned above said lattice;
said textile lattice comprising:
a plurality of highly tension resistant first strips, having a width of at least 4 cm, positioned in a substantially longitudinal direction of said composite fabric web at a predetermined distance from one another of at least 30 cm, and
a plurality of highly tension resistant second strips, having a width of at least 4 cm, positioned substantially laterally to said first strips at a distance from one another of at least 30 cm and being connected to said first strips at crossing points in a slip-resistant manner,
wherein, on edge areas of said composite fabric web, coupling devices are provided at the laterally running second strips that cooperate with complementary coupling devices of a neighboring composite fabric web.

19. The composite fabric web according to claim 18, wherein said coupling devices comprise one of hooks and eyelets and said complementary coupling devices comprise the other of eyelets and hooks, respectively.

20. A composite fabric web for reinforcing soil layers, comprising:
a textile lattice; and
a water-permeable flat textile structure connected to and positioned above said lattice;
said textile lattice comprising:
a plurality of highly tension resistant first strips, having a width of at least 4 cm, positioned in a substantially longitudinal direction of said composite fabric web at a predetermined distance from one another of at least 30 cm, and
a plurality of highly tension resistant second strips, having a width of at least 4 cm, positioned substantially laterally to said first strips at a distance from one another of at least 30 cm and being connected to said first strips at crossing points in a slip-resistant manner,
wherein said web is about 8 to 12 m wide and is folded in the area of its longitudinal center into a 4 to 6 m wide double web and then coiled into a roll.

21. The composite fabric web according to claim 20, wherein said composite fabric web is folded in such a way that said stretchable flat textile structure lies inside and said longitudinally running strips of one half are positioned between said strips of the other half.

22. A process for consolidating a soil layer, wherein a composite fabric web comprising, a textile lattice comprising, a plurality of highly tension resistant first strips, having a width of at least 4 cm, positioned in a substantially longitudinal direction of said composite fabric web at a predetermined distance from one another of at least 30 cm, and a plurality highly tension resistant second strips, having a width of at least 4 cm, positioned substantially laterally to said first strips at a distance from one another of at least 30 cm and being connected to said first strips at crossing points in a slip-resistant fashion and a water-permeable flat textile structure connected to and positioned above said lattice, is provided; the process comprising:

spreading the composite fabric web onto the soil of a soil layer to be consolidated;

compressing the composite fabric web with a filling of a mixture of at least one of sand, gravel, rubble, and broken rock in a layer of 30 to 60 cm, but not higher than a clear width of the lattice areas;

compressing the filling first statically and then dynamically with a contact pressure of 50 to 150 kN/m$^2$;

applying a second layer of filling of at least 30 cm; and further compressing the second layer.

23. The process according claim 22, wherein the second layer is compressed with an increased force.

24. The process according claim 23, wherein the process is used for consolidating a soil layer for a roadway.

25. The process according to claim 22, further comprising:

installing a second composite fabric web next to a first installed composite fabric web, which overlaps the first composite fabric web to such an extent that the areas at the left or right edge of the second composite fabric web are positioned above the areas at the right or left edge of the first composite fabric web.

* * * * *